May 4, 1965   J. J. BRUNNER ET AL   3,181,685
ARTICLE SORTING SYSTEM
Filed April 26, 1962   4 Sheets-Sheet 4
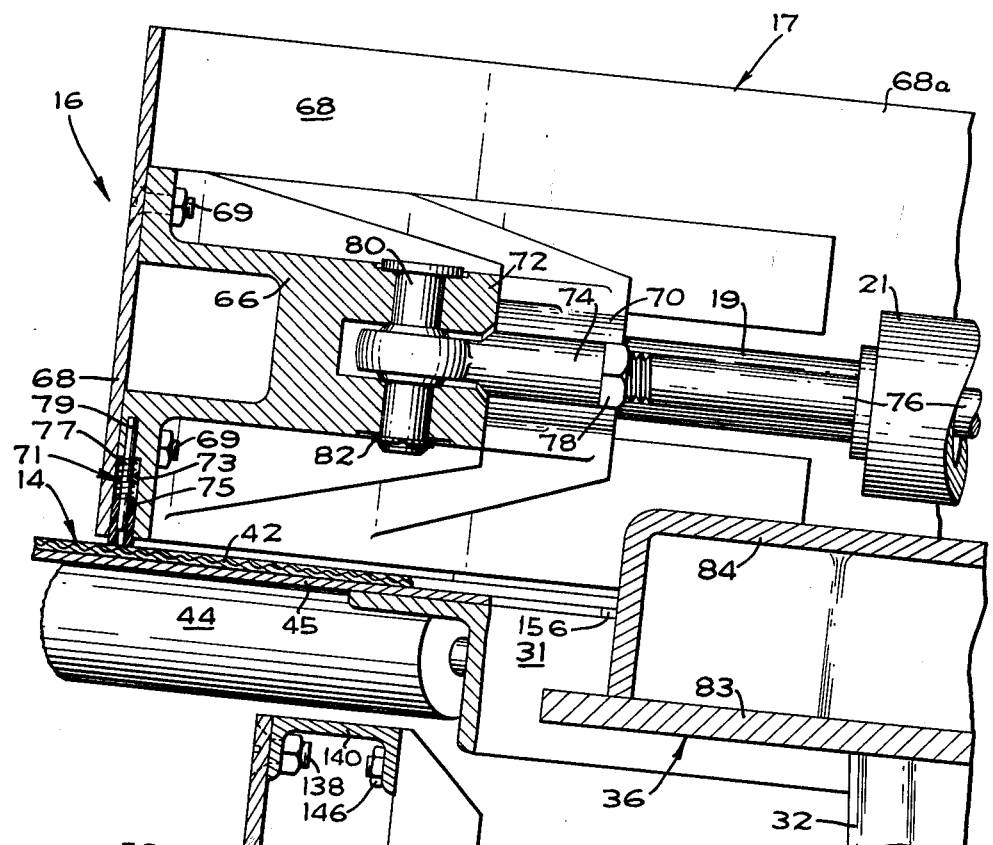
FIG_6
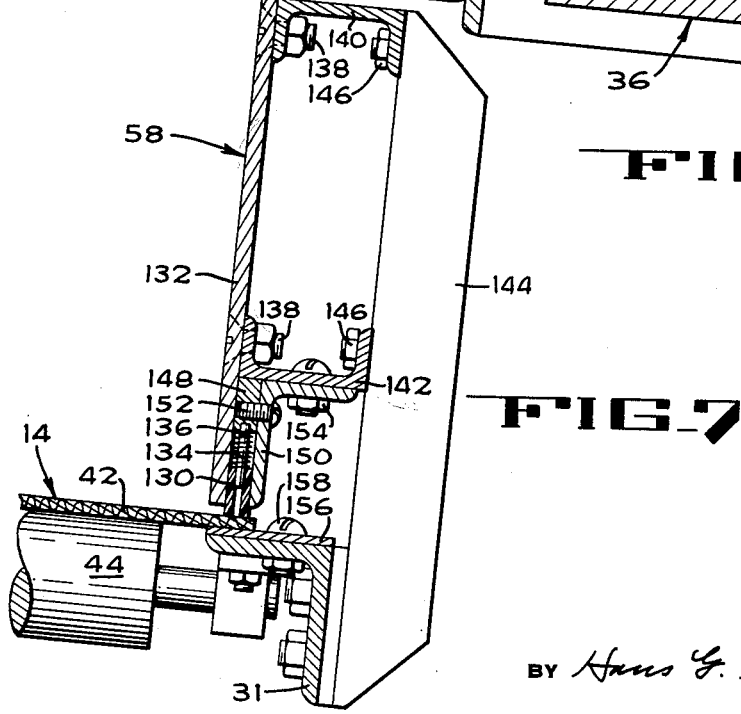
FIG_7
INVENTORS
JACQUES J. BRUNNER
WILLIAM W. COLLINS
BY Hans G. Hoffmeister
ATTORNEY

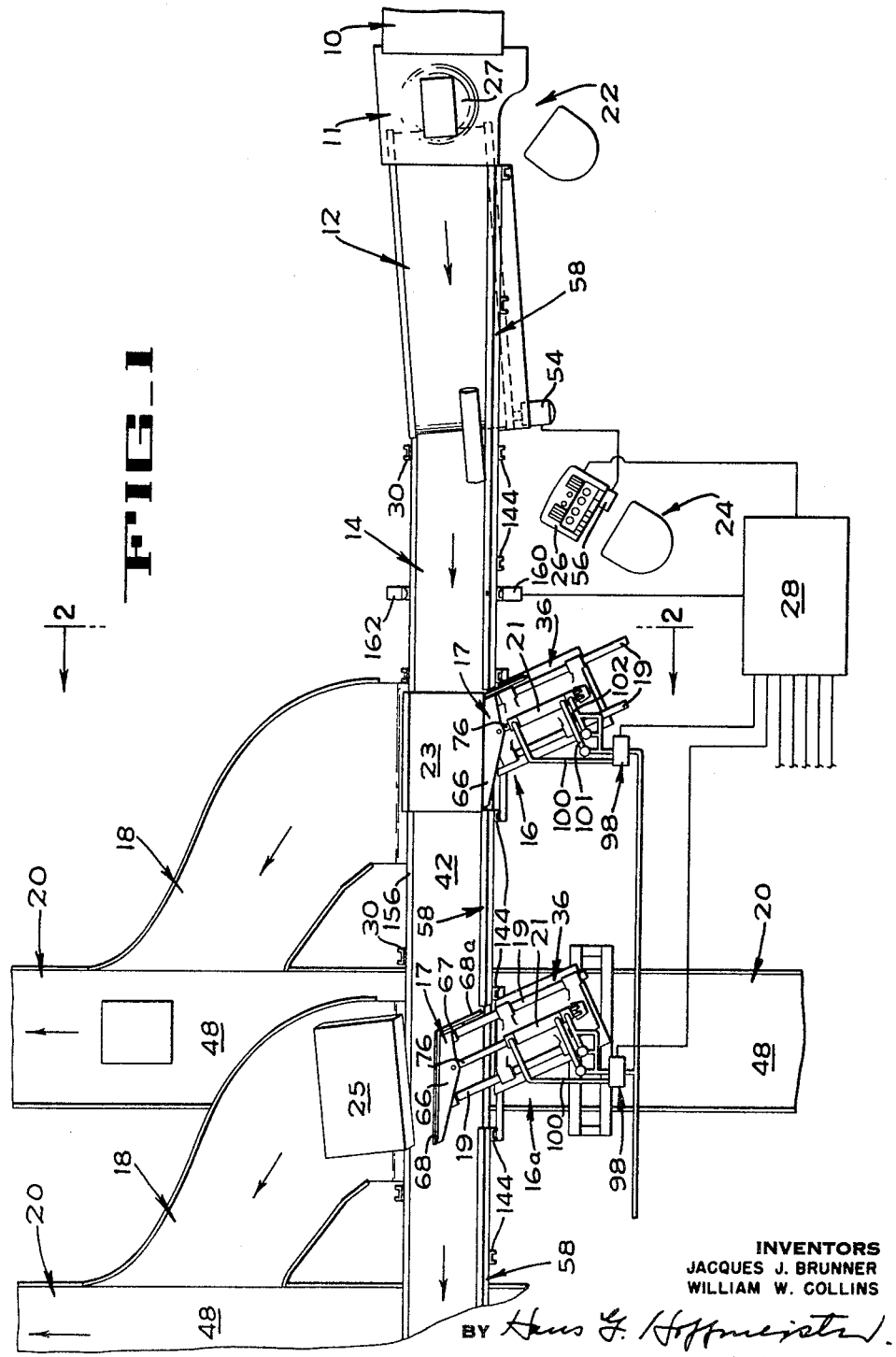

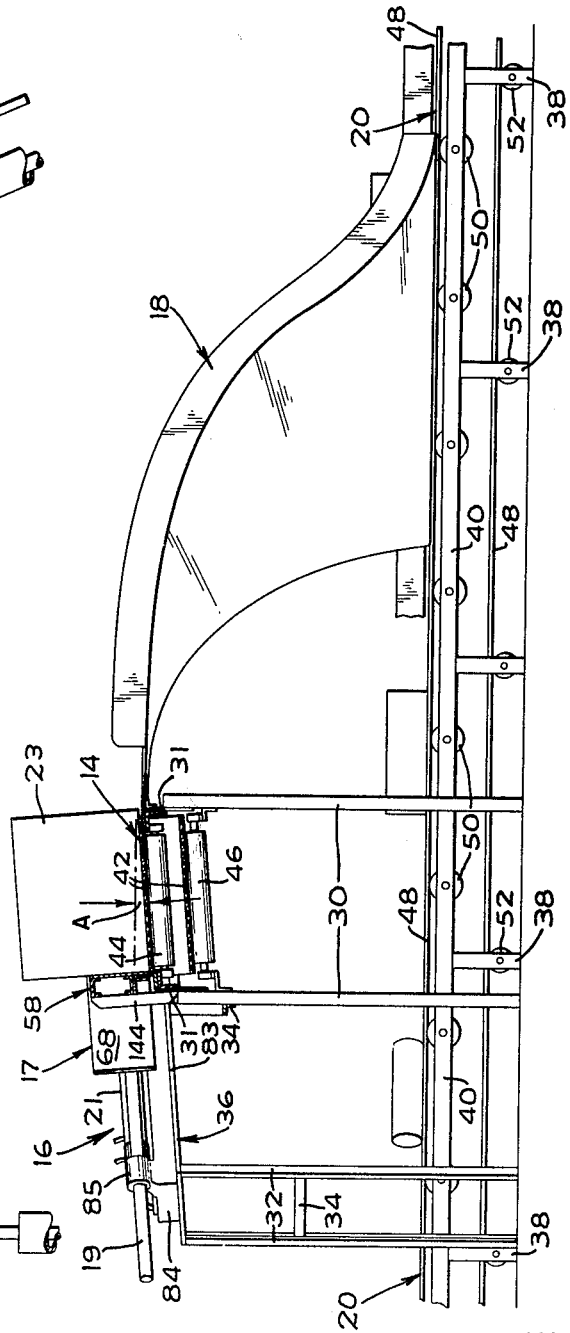
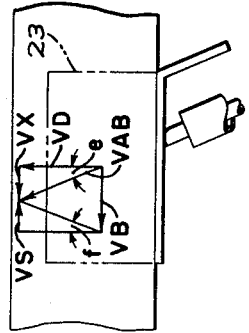
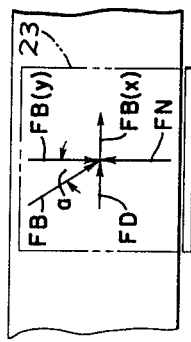

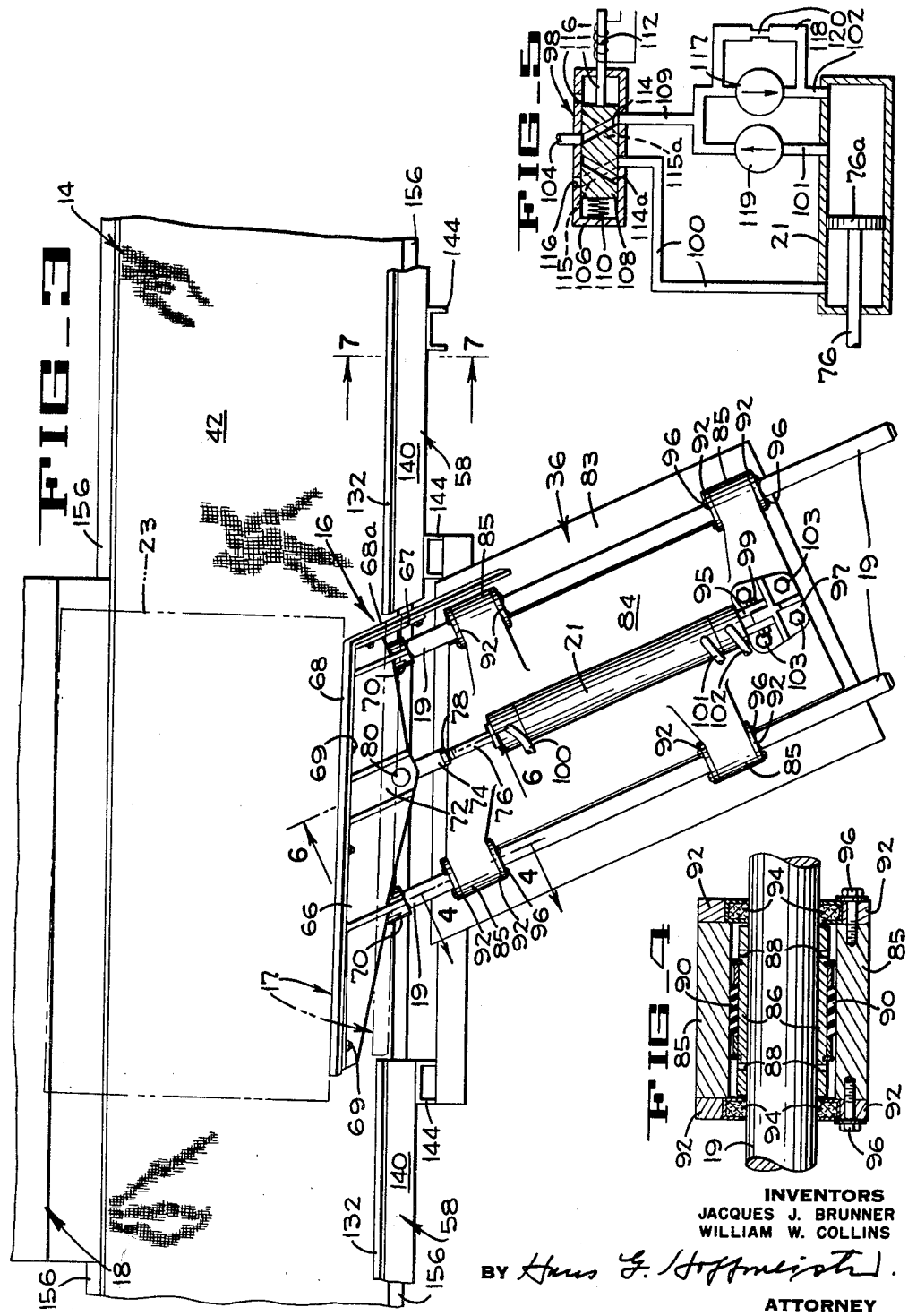

United States Patent Office 3,181,685
Patented May 4, 1965

3,181,685
ARTICLE SORTING SYSTEM
Jacques J. Brunner and William W. Collins, San Jose, Calif., assignors to FMC Corporation, San Jose, Calif., a corporation of Delaware
Filed Apr. 26, 1962, Ser. No. 190,421
6 Claims. (Cl. 198—24)

This invention relates to article sorting systems of the type wherein discrete articles are conveyed along a conveyor from which they may be selectively diverted and more particularly relates to article diverters for use in connection with such systems.

An object of the present invention is to provide an article conveyor system whereby articles may be diverted from a conveyor quickly and without damage.

Another object of the present invention is to provide an improved diverter for use in connection with article conveyors.

Another object is to provide an article sorting system incorporating article diverter means which will successfully handle cylindrical and other rounded articles.

Another object is to form an article diverter for use in article conveying systems which will divert a selected article from a fast moving conveyor carrying a series of closely spaced articles with speed and precision and without damage to the article.

Another object is to provide a diverting conveyor system capable of efficiently handling articles which vary widely in weight, size and shape so that it is suitable for use in connection with post office parcel sorting systems.

These and other objects and advantages of the present invention will become apparent from the following detailed description and accompanying drawings in which:

FIG. 1 is a plan indicating the general layout of part of a parcel sorting system formed in accordance with this invention.

FIG. 2 is an enlarged vertical section of the system of FIG. 1 taken along line 2—2 of FIG. 1.

FIG. 3 is an enlarged plan of a portion of FIG. 1 illustrating in greater detail the diverter and its operation.

FIG. 4 is an enlarged vertical section of one of the guide rod bearings of the diverter shown in FIG. 3 and is taken along line 4—4 of FIG. 3.

FIG. 5 is a diagrammatic representation of a pneumatic control system suitable for use in connection with the diverter illustrated in FIG. 3.

FIG. 6 is an enlarged vertical section of a portion of the diverter illustrated in FIG. 3 taken along line 6—6 of FIG. 3.

FIG. 7 is an enlarged vertical section of a portion of the conveyor skirt board and conveyor taken along line 7—7 of FIG. 3.

FIG. 8 is a diagram of the article diverter portion of the system, illustrating the forces involved in the diverting of a package.

FIG. 9 is a diagram of the diverter portion of the system particularly indicating the velocity of the various components of the system during the diverting of a package from the conveyor.

The sorting system of the present invention will be described in connection with a parcel sorting system which would have particular utility in a post office, however, it is evident that this system may be readily used in a large variety of article handling systems in which large numbers of randomly presented discrete articles must be classified into a plurality of separate groups. It will also be noted that the present system is modular, that is; the articles can be sorted from any convenient number of primary conveyors, each fed by its own chute and feed conveyor, into any convenient number of secondary conveyors, each of which could be associated with a separate classification. The sorting may be progressive, classes being divided into subclasses by the repeated use of the same system, or it may be simultaneous, parcels being divided into classes by two or more primary conveyors working simultaneously and feeding the same secondary conveyors.

Basically the conveyor system comprises a chute 10 into which batches of parcels for sorting may be dumped or conveyed, a facing platform 11 on which the parcels may be manually oriented, an oblique feed conveyor 12 onto which the parcels are placed and by which they are fed, into aligned position, on a primary conveyor 14, and a plurality of diverters, only two diverters 16 and 16a being shown, arranged adjacent to the primary conveyor 14 to push selected parcels from the primary conveyor down transfer chutes 18 onto secondary conveyors 20.

In the illustrated system, two operators are required to effect the sorting of the parcels; a facing operator at a facing station 22 adjacent table 11, and a coding operator at a coding station 24 near the discharge end of oblique conveyor 12. The facing operator guides or moves the parcels from the chute 10 onto the facing platform 11 which has a slightly domed surface 27 designed to facilitate the turning of each parcel by the facing operator so that its label is presented for convenient viewing by the coding operator. Each oriented parcel is pushed by the facing operator from the facing platform 11 onto the feed conveyor 12 and a code appropriate to its address is recorded on a coding panel 26 as the parcel passes the coding operator. The coded information passes to a memory and coordinating unit 28 which, at the appropriate time, actuates the appropriate diverter 16 or 16a so the parcel is directed onto the correct secondary conveyor 20.

Although the diverters 16 and 16a will be described subsequently in greater detail, it should now be noted that each consists basically of a blade assembly 17 (FIG. 1) fixed to guide rods 19 and slidable by a pneumatic actuating cylinder assembly 21 to push an article carried on the primary conveyor 14 into the opposing transfer chute 18. In FIGURE 1, a parcel 23 is shown passing along the primary conveyor 14 opposite the first diverter 16, while a second parcel 25 is shown as it might appear immediately after being pushed from the primary conveyor 14 by the second diverter 16a.

More particularly, FIGURE 2 of the accompanying drawings shows that the primary conveyor 14 is mounted on a framework consisting principally of vertical posts 30 and horizontal longitudinal angle rails 31 through and beneath which each secondary conveyor 20 passes transversely. A sub-framework of posts 32 and members 34 support a bed-plate 36 of the diverter 16, while a framework of posts 38 and rails 40 support the secondary conveyor 20. Both of the conveyors 14 and 20 are belt conveyors in which the majority of the load is supported on rollers beneath the belt; the belt 42 of the primary conveyor 14 running on upper rollers 44 and on flat bed-plates 45 opposite each diverter (FIG. 6) and returning underneath on lower rollers 46, while the belt 48 of the secondary conveyor 20 runs on upper rollers 50 and returns on lower rollers 52. On the other hand, the feed conveyor 12 (FIG. 1) which is also a conventional belt conveyor, is preferably relatively short and its upper run may slide over a support plate (not shown) like the bed-plates 45 to provide a firm and flat support for the parcels carried thereby. Conveyor 12 is arranged at a slightly higher level than the primary conveyor 14 so that articles may be transferred onto the primary conveyor 14 as indicated in FIGURE 1. However, although conveyors 14 and 20 are each driven by a constant speed motor (not shown), conveyor 12 is driven by a variable speed motor 54 (FIG. 1) which is controlled from a foot switch 56 at the coding station 24 so that the coding operator can regulate the spacing of the parcels on the primary conveyor 14: an important function, since parcels must not be spaced together on the primary conveyor by a distance less than a predetermined minimum.

An important feature of the illustrated embodiment of the invention lies in the transverse inclination to the horizontal of the primary conveyor 14, as clearly shown in FIGURE 2. In this example, the angle of inclination A is about 5° and the bed-plate 36 of each diverter 16 and 16a is similarly arranged so that the lower edge of the diverter blade assembly 17 will move parallel with and close to the surface of the main conveyor 14 when the pneumatic cylinder assembly 21 is actuated. A fixed skirt board assembly 58 is mounted to extend along the lower longitudinal edge of the primary conveyor 14 and is interrupted at the location of each diverter 16 and 16a to accommodate the diverter blade assembly. In effect, therefore, the face of each diverter blade assembly 17 normally acts as part of the skirt board assembly 58. The feed conveyor 12 is preferably also transversely inclined to the horizontal in the same way as primary conveyor 14. Therefore, as indicated in FIGURE 1, the skirt board assembly 58 passes at an angle over the surface of the conveyor 12 into registry with corresponding side edge of the facing platform 11.

Referring now to FIGURE 3, the diverter 16 is shown in detail and, as previously indicated, basically comprises the blade assembly 17 and guide rods 19 slidably located on the bed-plate 36 and driven by the pneumatic actuating cylinder assembly 21. The blade assembly 17 comprises a ribbed light alloy body casting 66 on the front of which a face plate 68 (FIG. 6) is secured by the countersunk screw and nut assemblies 69, the face plate 68 having a portion 68a extending around and back along the leading edge 67 of the body casting 66 to prevent misplaced parcels from being caught behind it as it returns from its extended position.

As shown in FIGURE 6, the face plate 68 also extends downwardly so as to be closely spaced from the upper surface of the conveyor belt 42 both along the length of the blade assembly and along the turned edge portion 68a. Owing to irregularities in the conveyor belt 42, it is not normally prudent to space the lower edge of the face plate 68 less than about ¼ of an inch from the surface of the belt 42 and, therefore, a seal strip assembly 71 is housed in a groove 73 at the lower front edge of the blade assembly 17 and is fixed laterally in place when the face plate 68 is secured to the body 66. The seal strip 71 consists simply of rubbing strip 75 biased into contact with the conveyor belt 42 by springs 77 and located for vertical sliding movement with respect to the rest of the blade assembly 17 by the guide pins 79 fixed in the body casting 66. Thus, the thin edges of parcels or other articles cannot become caught or wedged beneath the lower edge of the face plate 68 when the diverter is either operated or in its normal position.

The body casting 66 of blade assembly 17 has two bosses 70 formed integrally therewith, one near each end so as to extend parallel to one another away from the front of the blade at an angle of 22° in the horizontal plane to the blade face but perpendicular thereto in the vertical plane. Each boss 70 mounts the forward end of the corresponding guide bar 19 which is fixed therein by any suitable means. Extending centrally between, parallel to, and coplanar with the bosses 70 is a bracket 72 formed integrally with the body casting 66 for the accommodation of the self aligning eye-member 74 which is screwed onto the free end of the piston rod 76 and fixed in place by lock-nut 78. The eye-member 74 is attached to the blade assembly 17 by an upright pin 80 which, in turn, is fixed in place by a clip-ring 82 (FIGURE 6).

The diverter bed-plate 36 is a composite member comprising a base plate 83 (FIG. 6) and a ribbed casting 84 which has two integral and coaxial bearing bosses 85 (FIGURE 3) on each side thereof for the accommodation of the corresponding guide rod 19. Referring particularly to FIGURE 4, it will be seen that the guide rod 19 is slidably mounted in each bearing boss 85 by a conventional self aligning bearing shell 86 suitably lubricated through the holes 88 formed therein. The bearing shell 86 is self aligning because it is resiliently mounted within the boss 85 by means of a resilient bushing 90 and it is axially located in position by the end plates 92 and protected from the ingress of dirt by the annular seals 94. Each end plate 92 is secured to the boss 84 by means of bolts 96.

The diverter actuating cylinder assembly 21 is also of conventional design and may be controlled by a conventional solenoid operated valve 98 which selectively supplies and exhausts air from either end of the cylinder through the air hoses 100, 101 and 102 (FIGURES 1 and 3). The end of the cylinder 21 remote from the blade has a fork-like extension 95 which is fixed to the bracket 97 by an anchor pin 99, the bracket 97 in turn being secured to the bed-plate 36 by bolts 103.

Although the construction and operation of the cylinder assembly 21 is not part of this invention, it will be described for the sake of clarity with reference to FIGURE 5. Compressed air is supplied to the valve 98 of each diverter 16 and 16a by a common supply line 104 and exhausted from each valve through either of two ports 116. The valve 98 itself may be considered to consist of a cylindrical housing 106 within which a control piston 108 may slide, piston 108 being urged by a spring 110 toward the right hand end of the housing 106 as shown in FIGURE 5 and movable against the bias of spring 110 by an armature 111 when a solenoid coil 112 is energized. The control piston 108 has passages 114, 115, 114a and 115a formed therein such that, when the piston 108 is in the position indicated in FIGURE 5, hose 100 is connected by the passage 115 with an exhaust port 116; and hoses 101 and 102 are connected by means of a common hose 109 to the air pressure supply pipe 104 by the passage 114. In such a position, air from the supply pipe 104 is directed through the forwardly biased one way valve 117 to the end of the cylinder 21 remote from the conveyor 14. Supply air does not pass through the hose 101 because the one way valve 119 is reversely biased.

On the other hand, when the solenoid coil 112 is not energized and the control piston 108 is moved by spring 110 to the other position, air is supplied from the supply 104 through the passage 114a and the hose 100 to the forward end of the cylinder 21 and is exhausted from the rear end of the cylinder 21 through the now forwardly biased one way valve 119, hoses 101 and 109, and the passage 115a, the one way valve 117 being closed. Once the piston 76a passes beyond the point of connection of hose 101, the free exhausting of air from the rear part of the cylinder is prevented, and a cushion of air is formed in the rear end of the cylinder to prevent the diverter plate assembly 17 from slamming hard against its stops. However, to insure that the blade assembly 17 always comes to rest positively in the position indicated by the phantom lines in FIGURE 3, a by-pass connection 118 is formed around the one way valve 117 and includes a restriction 120 through which the cushion of air may be bled from the rear of the cylinder 21.

Referring now to FIGURE 7, it will be noted that the skirt board assembly 58 includes a spring loaded rubbing strip 130 to form a sliding seal with the upper surface of the corresponding side edge of the belt 42 to prevent thin edges of parcels from being wedged between a facing strip 132 and the belt 42. The rubbing strip 130 is biased onto the surface of belt 42 by means of springs 134, and is guided for vertical movement by pins 136.

The facing strip 132 is secured by means of countersunk screw and nut assemblies 138 to two longitudinally extending channel members 140 and 142 which act as spacers to position the upper and lower edges, respectively, of the face plate 132 inwardly of vertical channel supporting members 144 to which channels 140 and 142 are secured by the nut and bolt assemblies 146. A suitable groove is formed for the rubbing strip 130 by means of a spacer block 148, into which the guide pins 136 are driven, and the vertical leg of an angle 150 to which the block 148 is secured by means of screws 152. The angle 150 is, in turn, secured by screw assemblies 154 to the lower longitudinal channel 142. The entire skirt board assembly 58 is therefore supported by the vertical channels 144 from the conveyor guide rails 31 and, in order to reduce the rubbing frictional contact between the belt 42 and the guide rails 31, a wear strip 156 is secured to the upper leg of the angle rail 31 by means of screw assemblies 158.

From the above description it will now be seen that the feed conveyor 12 not only serves to control the frequency at which parcels are deposited on the primary conveyor 14 but, by virtue of its oblique orientation relative to the primary conveyor, also serves to arrange each parcel against the skirt board 58. The parcels, irrespective of shape, are retained in this position of alignment with the skirt board by the transverse inclination to the horizontal of the primary conveyor and travel therealong in close proximity to the skirt board. As previously indicated, the coded information corresponding to the destination of each parcel is transferred from the coding panel 26 to the memory 28 for storage and translation into appropriately timed diverter operating signals. The precise position of each parcel on the primary conveyor 14 is derived by the memory from the signals of a photo cell 160 which is arranged opposite the light source 162 and detects each parcel as it passes along the primary conveyor. Thus, when the parcel comes exactly opposite the diverter corresponding to the class into which it is to be sorted, the memory provides an electrical pulse to operate the solenoid valve 98 for a brief period of time so that the diverting blade assembly 17 of the diverter 16 or 16a quickly pushes the parcel down the chute 18 onto the appropriate secondary conveyor 20.

Conveyor systems of the above type are required to handle large numbers of parcels daily and it is important to arrange and construct the system elements in such a way that the parcels can be handled quickly and without damage. In this instance, the feed conveyor 12 insures that most parcels, particularly the heavy rectangular ones, are aligned so that one edge travels close to the skirt board, while the inclination of the main conveyor 14 insures that the round or cylindrical parcels gravitate to and remain against the skirt board assembly 58. There is, it will be noted, only one skirt board assembly on the conveyor 14 and the maximum parcel width which may be handled by the conveyor 14 is considerably wider than the width of the belt 42. In fact, the width of the belt can be reduced to almost half the width of the maximum sized parcel that the sorting system is required to handle and, when such a belt is used, it will be relatively easy for the diverter to push each parcel across the belt into the transverse chute. Furthermore, because each parcel goes along the conveyor 14 closely adjacent the skirt board 58, there is very little impact between the diverter blade assembly and the parcel during diversion and, accordingly, high diverter blade speeds may be used. The machine capacity is thus determined by the maximum speed at which the main conveyor 14 may travel and by the minimum spacing of parcels on the conveyor. These two limitations are, in part, interdependent.

The absolute minimum spacing of the parcels on the conveyor, trailing edge to trailing edge, is clearly equal to the diverter blade length, because closer spacing would result in adjacent parcels being struck by the diverter blade. If, for example, the blade length is reduced to just a few inches, the diversion of large parcels may result in indentation damage to the parcels by the blade and, were the blade to strike the parcel other than in line with its center of gravity, the parcel may be misdirected. Thus, extreme precision in diverter operation would be necessary. On the other hand, the fast diversion of small parcels would also require extremely precise diverter actuation and negligible relative movement between the parcel and the blade. To fulfill the latter requirements, the conveyor velocity must be reduced with a consequent loss of production capacity. Furthermore, since the diverter takes a finite time to operate, the spacing of the parcels can never be equal in fact to the absolute minimum and must increase in proportion to the conveyor speed. Therefore, the actual minimum spacing will be determined by a suitable compromise between the conveyor speed and the diverter blade length.

According to a novel feature of this invention, the diverter and conveyor are constructed and arranged so that practically no slip between the parcel and diverter blade takes place so that the diverter blade length may be considerably reduced. To illustrate this feature, attention is directed to FIGURES 8 and 9 where force and velocity vector diagrams have been drawn to assist in the analysis of the diversion of a parcel. Referring to the force diagram (FIG. 8) it should be assumed for the moment that the blade moves perpendicularly to the conveyor belt and that the diverting force acting on the parcel is FN and acts normal to the belt motion. The article, however, will move across the belt at some angle $a$ to the force FN, and therefore the force FB which results from the coefficient of friction of the article with respect to the belt acts on the article in this direction. During diversion, the forward movement of the article with the belt is opposed by the force FD generated by the coefficient of friction between the article and blade. If FB is resolved into its longitudinal and normal components $FB(x)$ and $FB(y)$, respectively, and the weight of the article is assumed to be W, the following equations can be written wherein "$b$" is the coefficient of friction of the article with respect to the belt and "$d$" is the coefficient of friction of the article with respect to the blade.

(1)    $FB(y) = (FB)(\cos a) = (W)(b) \cos a$
(2)    $FN = (W)(b) \cos a$
(3)    $FB(x) = (W)(b) \sin a$
(4)    $FD = (FN)(d) = (W)(b)(d) \cos a$ Since $FB(x)$ must be equal to FD, from (3) and (4)

(5)    $(W)(FB) \sin a = (W)(FB(d) \cos a$

Therefore $\tan a = d$

Thus the angle of movement of the parcel to the belt ($a$) depends only upon the coefficient of friction ($d$) between the article and the blade.

If, for example, it is further assumed that the velocity of the belt VB is four feet per second, the diverter blade velocity VD perpendicular to the belt is five feet per second, and the actual velocity of the article with respect to the belt is VAB, then the velocity vector diagram can be drawn as shown in FIGURE 9 to obtain the velocity VS (slip velocity) of the article with respect to the belt in the direction of the belt movement which results the braking effect of the blade to parcel friction, and to obtain the longitudinal velocity VX of the article with respect to the blade during diversion. The following equation may then be written:

(1)    $VX = VB - VD \tan f = VB - (VD)(d)$

Assuming that the blade stroke is one foot, then the movement M of the parcel with respect to the blade is given by:

(2)    $M = tp \ (VB - VD \times d)$ where $tp$ is the pushing time. In the present case, neglecting accelerating forces and assuming $d$ to be 0.4:

(3) $\qquad M = 0.20 \ (4-5 \times 0.4) = 0.4$ ft.

To eliminate relative motion between the article being diverted and the blade (that is to make $X=0$) and thereby reduce the likelihood of damage to the article and reduce the length of the blade needed, the forward angle $e$ of the diverter can be found as follows:

$$VB = VD \ (\tan f + \tan e) = (d)(VD) + (VD)(\tan e)$$

Therefore, $$\tan e = \frac{VB}{VD} - d$$

In the present case, $\tan e = \frac{4}{5} - 0.4 = 0.4$ therefore, $e$ is equal to 22° approximately.

In short, by inclining the diverters at a forward angle of 22° with respect to the conveyor belt, slip between the article and the diverter blade can be entirely eliminated irrespective of the weight of the article and provided only that the article to the blade friction is substantially constant. These conditions are well met where the articles are post office parcels and the blade length may therefore be correspondingly reduced to permit closer spacing of the parcels on the primary conveyor, closer spacing of the diverters along the primary conveyor, and closer spacing of two primary conveyors one to the other.

Having thus described our invention what we claim as new and desire to protect by Letters Patent is:

1. In a system for sorting articles, the combination of an elongate article conveying surface arranged to support and convey a succession of spaced irregularly shaped articles along a predetermined generally horizontal path, a longitudinally extending skirt board arranged to upstand from the conveying surface and to lie substantially coplanar with a side boundary of said path, an article diverter blade normally forming a portion of said skirt board but mounted for rapid bodily movement across the article path from the plane of the remainder of the skirt board to shift a predetermined article from said path, and a power driven feeding and aligning conveyor arranged at the forward end of said conveying surface for depositing the articles in succession on said conveying surface adjacent said skirt board; the skirt board extending over the feeding and aligning conveyor, means mounting said feeding and aligning conveyor at an angle relative to said skirt board for positively moving articles placed thereon to a position against the skirt board, said conveying surface and path being transversely and downwardly inclined toward the skirt board so the articles conveyed thereby tend to gravitate toward the skirt board, articles arranged adjacent the skirt board will not roll or shift therefrom during conveyance, and so that articles will pass closely adjacent said blade.

2. Article sorting apparatus of the type comprising an endless generally horizontally running article conveyor for transporting a succession of irregularly shaped articles to be sorted to at least one diverting station where predetermined articles are diverted from the conveyor, said sorting apparatus comprising means mounting said conveyor in a position transversely inclined to the horizontal, a skirt board adjacent to and extending along the lower side of the conveyor, an article diverting means positioned at each diverting station and including an article diverting blade normally arranged to form portion of said skirt board, means mounting said blade for rapid bodily movement across the article path from the plane for the remainder of the skirt board to divert an article from the conveyor, the blade remaining substantially parallel to the remainder of the skirt board during said movement, and a power driven feeding and aligning belt conveyor arranged at the forward end of said conveying surface for depositing the articles in succession on said conveying surface against the skirt board, the skirt board extending over the feeding and aligning conveyor so that articles placed on the feeding and aligning conveyor are moved to a position of alignment along the skirt board, the transverse inclination of the conveyor serving to retain the articles, particularly those of the round or rotund section, closely adjacent the skirt board during the conveyance thereof so that each diverter blade may act upon the predetermined articles to divert them from the conveyor substantially without impact.

3. Article sorting means comprising an endless conveyor belt having an article carrying surface transversely inclined to the horizontal for transporting a succession of spaced irregularly shaped articles for sorting, a skirt board arranged immediately above the lower longitudinal edge of the carrying surface and extending parallel therewith, a diverting blade arranged at a diverting station adjacent said lower edge and located within a gap in the skirt board to normally lie coplanar with the skirt board immediately above the lower longitudinal edge of a carrying surface, blade actuating means at said station for moving said blade rapidly across the conveyor surface to push a parcel from said surface, a longitudinally extending sealing strip mounted on the lower edge of the diverting blade, spring means adapted to bias said sealing strip downwardly into contact with the belt to prevent thin edges of parcels from becoming caught beneath the diverting blade, and an additional sealing strip mounted by the lower edge of the skirt board and also arranged to press against the belt to prevent the edge of a parcel or article from becoming caught beneath the skirt board.

4. An article sorting system comprising an endless article conveyor for conveying a succession of spaced articles to be sorted past at least one article diverting station, article diverting means at each station for diverting predetermined articles from the conveyor, an article diverting blade forming part of the diverting means and mounted above the conveyor on one side thereof so as to extend parallel with the side edge of the conveyor, blade drive means also forming part of the diverting means for moving the blade rapidly and bodily across the conveyor toward the other side thereof to divert a parcel from the conveyor and for rapidly withdrawing the blade to its normal position, the blade being moved in a direction inclined forwardly from the normal to the conveyor by an angle such that the sum of its tangent and the coefficient of friction between an article and the blade is substantially equal to the ratio of the velocity of the conveyor to the component of blade velocity normal to the conveyor, so that the article being diverted remains substantially stationary with respect to the blade during diversion and so the blade length required for effective diversion is minimal.

5. The system of claim 4, wherein a skirt board extends longitudinally along one side of said conveyor, and said conveyor is transversely inclined downwardly toward said skirt board.

6. The system of claim 2, wherein said diverting blade is moved in a direction forwardly inclined from the normal to the conveyor by an angle such that the sum of its tangent and the coefficient of friction between the outside and the blade is substantially equal to the ratio of the velocity of the conveyor to the component of blade velocity normal to the conveyor.

References Cited by the Examiner

UNITED STATES PATENTS

| | | | |
|---|---|---|---|
| 2,205,059 | 6/40 | Clark | 198—24 |
| 2,508,086 | 5/50 | Alvarez | 198—38 |
| 2,569,011 | 9/51 | Laprise | 198—188 |
| 2,581,732 | 1/52 | Thompson | 198—33.1 |
| 2,814,378 | 11/57 | Ekholm | 198—185 |
| 2,833,393 | 5/58 | Kay | 198—85 |
| 3,049,247 | 8/62 | Lemelson | 198—185 X |
| 3,083,808 | 4/63 | Graybeal | 198—185 X |

SAMUEL F. COLEMAN, *Primary Examiner.*

WILLIAM B. LA BORDE, *Examiner.*